United States Patent [19]

Itoh et al.

[11] 4,415,233

[45] Nov. 15, 1983

[54] ACHROMATIZED BEAM SPLITTER OF LOW POLARIZATION

[75] Inventors: Susumu Itoh, Tokyo; Mitsuharu Sawamura, Yokohama, both of Japan

[73] Assignee: Canon Kabushiki Kaisha, Tokyo, Japan

[21] Appl. No.: 339,659

[22] Filed: Jan. 15, 1982

[30] Foreign Application Priority Data

Feb. 5, 1981 [JP] Japan .................................. 56/16221

[51] Int. Cl.³ .................... G02B 27/10; G02B 5/28; G02B 5/04
[52] U.S. Cl. .................... 350/173; 350/164; 427/166
[58] Field of Search ............... 350/173, 164, 166, 163, 350/169-172, 286, 287, 1.7; 427/164-166, 168, 169

[56] References Cited

U.S. PATENT DOCUMENTS

| 2,815,695 | 12/1957 | Scharf et al. | 350/164 |
|---|---|---|---|
| 3,559,090 | 1/1971 | Refermat et al. | 350/173 |
| 3,934,961 | 1/1976 | Itoh et al. | 350/164 |
| 4,161,547 | 7/1979 | Kienel | 350/164 |
| 4,260,222 | 4/1981 | Kozawa | 350/164 |
| 4,367,921 | 1/1983 | Sawamua et al. | 350/164 |

*Primary Examiner*—Jon W. Henry
*Attorney, Agent, or Firm*—Fitzpatrick, Cella, Harper & Scinto

[57] ABSTRACT

An achromatized beam splitter of a low polarization comprising a transparent first prism, a transparent second prism and a thin film group provided between the first prism and the second prism. The thin film group comprises, in succession from the first prism to the second prism, a first dielectric material thin film layer provided on the inclined surface of the first prism which first layer is a mixture of titanium oxide and zirconium oxide, a metal thin film layer provided on the first dielectric material thin film layer which metal layer consists of silver, and a second dielectric material thin film layer provided on the metal thin film layer which second layer is a mixture of titanium oxide and zirconium oxide. The second dielectric material thin film layer has a film thickness substantially equal to that of the first dielectric material thin film layer.

5 Claims, 4 Drawing Figures

ACHROMATIZED BEAM SPLITTER OF LOW POLARIZATION

BACKGROUND OF THE INVENTION

1. Field of the Invention

This invention relates to an achromatized beam splitter of low polarization.

2. Description of the Prior Art

A beam splitter provided by forming reflecting film layers on the inclined surfaces of two right isosceles triangular prisms and joining the inclined surfaces together is known. For example, as shown in FIG. 1 of the accompanying drawings, such a beam splitter may be provided by forming a reflecting layer 13 consisting of a thin film of metal or dielectric material on the inclined surface of a right isosceles triangular prism 11, and joining a right isosceles triangular prism 12 thereto by the use of an adhesive agent. This reflecting layer 13, if it consists of a dielectric multilayer film, eliminates absorption, but the film construction thereof is complex and difficult to manufacture. Also, if this reflecting layer is comprised of a silver monolayer film, the light transmitted therethrough becomes blue and the light reflected thereby becomes yellowish, thus making the so-called achromatization impossible. Further, if the reflecting layer is comprised of a monolayer film of chromium, the loss of quantity of light will be large. The reflecting layer, if it consists of a multilayer film of dielectric material or a monolayer film of metal, results in a large difference in the polarized component between the transmitted light and the reflected light. The amount of such a difference in the polarized component leads to a great problem in some cases. For a construction of a beam splitter which suffers little from polarization, there is known U.S. Pat. 3,559,090. This beam splitter adopts, as the construction of the reflecting layer 13, a construction in which a layer of metal, such as silver, is sandwiched between dielectric layers of a single component having different optical thicknesses.

SUMMARY OF THE INVENTION

It is an object of the present invention to provide a beam splitter in which the difference in the polarized component is small and the loss of quantity of light is small.

It is a further object of the present invention to provide a beam splitter excellent in the so-called achromatization effect in which the transmitted light and the reflected light are colorless in the entire visible range.

It is still a further object of the present invention to provide a beam splitter which is excellent in chemical stability and physical durability.

It is yet still a further object of the present invention to provide a beam splitter which is easy to manufacture.

In the beam splitter according to the present invention, the above objects are achieved by adopting, as the reflecting layer provided between the first prism and the second prism, a symmetrical three-layer film construction in which mixture films of titanium oxide and zirconium oxide having equal thicknesses are provided on the opposite sides of a thin film layer of silver. The value of the optical film thickness of the mixture layers of titanium oxide and zirconium oxide is $\frac{1}{4}$ of the design wavelength $\lambda_0$.

The invention will become more fully apparent from the following detailed description thereof taken in conjunction with the accompanying drawings.

DESCRIPTION OF THE PREFERRED EMBODIMENT

Figure 1:
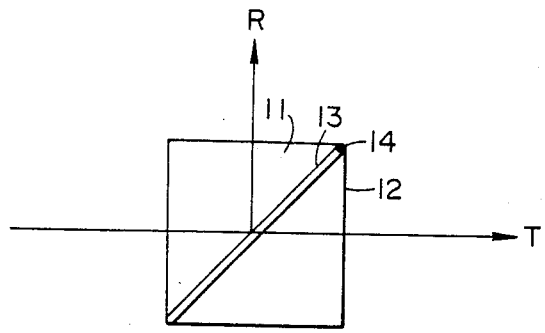
FIG. 1 is a view showing the cross-section of the beam splitter according to the prior art.
Figure 2:
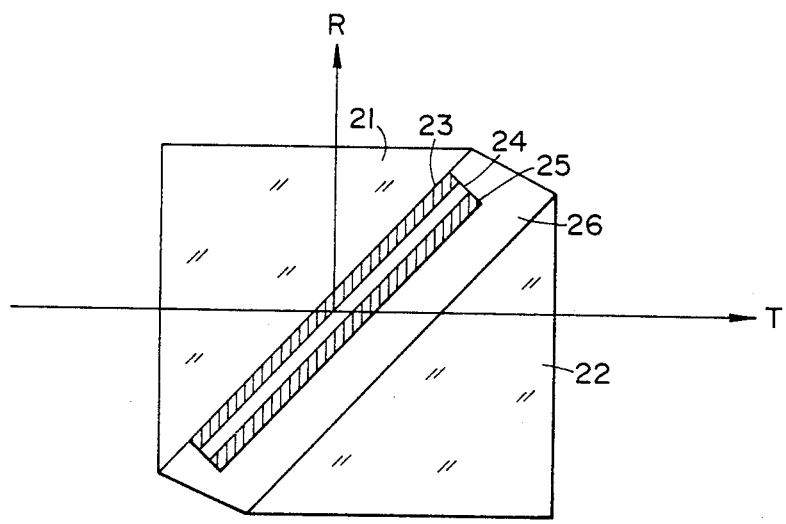
FIG. 2 is a view showing the cross-section of the beam splitter according to the present invention.

FIG. 2 shows a schematic cross-sectional view of an achromatized beam splitter of low polarization according to the present invention. First, a clean right isosceles triangular prism 21 was disposed in a vacuum evaporation apparatus, and then the interior of the vacuum evaporation apparatus was evacuated until the pressure therein reached the order of $1 \times 10^{-5}$ Torr. Then, a mixture of titanium oxide and zirconium oxide (whose mixture ratio is a mol ratio of 1:6–1:4) prepared in advance in the vacuum evaporation apparatus was heated and was evaporated by the use of an electron ray gun, whereby a mixture film 23 of titanium oxide and zirconium oxide having an optical thickness of about 150 nm for $\frac{1}{4}$ of the design wavelength and the visible range design wavelength 600 nm was deposited by evaporation on an inclined surface of the right isosceles triangular prism 21. The pressure in the vacuum evaporation apparatus when the mixture film 23 was deposited by evaporation was maintained at $2-5 \times 10^{-5}$ Torr. Subsequently, a silver film 24 was deposited by evaporation to a geometrical thickness of 23–30 nm on the mixture film 23. The silver was heated and was evaporated by the electrical heat of a vessel-shaped heater made of tungsten or molybdenum, and the pressure in the vacuum evaporation apparatus during the evaporation was maintained below $3 \times 10^{-5}$ Torr. Then, a mixture film 25 of titanium oxide and zirconium oxide was deposited by evaporation on the silver film 24 by the same method, to the same thickness and at the same conditions as those used for the deposition of the mixture film 23. During the deposit of the above-described three films, the prism 21 which is a substrate was not heated but was maintained at room temperature. The prism 21 having three symmetric films comprising the silver film 24 sandwiched between the mixture films 23 and 25 was removed from the vacuum evaporation apparatus and, as shown in FIG. 2, it was joined to another prism 22 by the use of a transparent adhesive agent 26.

The achromatized beam splitter of low polarization of the present invention thus formed, as compared with the conventional beam splitter, is excellent in optical characteristics such as achromatism and polarizing property. Moreover, it is excellent in productivity and durability. For example, the mixture films 23 and 25 comprising a mixture of titanium oxide and zirconium oxide at the mol ratio of 1:6–1:4 and deposited on the inclined surface of the prism 21 and the silver film 24, respectively, are excellent in the intimate contact force with respect to the prism 21 and silver film 24 as well as in the adhesion with respect to the adhesive agent.

The mixture films 23 and 25 deposited on the inclined surface of the prism 21 maintained at room temperature, as compared with other dielectric film deposited on a room temperature substrate, have excellent mechanical hardness, solvent resisting property and water resisting property. Therefore, the films have good working property with which two prisms are joined together, and they can be produced at a low cost. The fact that the film thickness of the mixture films 23 and 25 sandwiching the silver film 24 therebetween is equal to ¼ of the design wavelength leads to easy control of film thickness, and accordingly to the easy deposit operation, and also brings about an excellent effect in reproducibility and stability of optical characteristics. After the achromatized beam splitter of low polarization according to the present invention had been left in an atmosphere having a temperature of 45° C. and a relative humidity of 95% for about 500 hours, no variation in the optical characteristics thereof was apparently found and the practical durability thereof was sufficient. First Embodiment:

A clean right isosceles triangular glass (optical glass BK7) prism having a refractive index of 1.52 was disposed in a vacuum evaporation apparatus so that the inclined surface of the prism was opposed to an evaporation source, and the interior of the apparatus was evacuated until the pressure therein reached about $1 \times 10^{-5}$ Torr. Thereafter titanium oxide and zirconium oxide prepared in advance in the vacuum evaporation apparatus were mixed at a mol ratio of 1:6 and sintered in vacuum, and the resultant material was heated and evaporated by an electron ray gun, whereby a first mixture film of titanium oxide and zirconium oxide was formed on the inclined surface of the prism. The pressure in the evaporation apparatus during the deposition of this mixture film was $2-5 \times 10^{-5}$ Torr and the deposition speed of the film was 5-10 Å/sec. The film thickness of the mixture film was an optical thickness of about 150 nm. The control of the film thickness was effected by an optical type film thickness meter, and the film thickness was controlled so as to be ¼ wave-length when the wavelength was 600 nm. Subsequently, by the same vacuum evaporation apparatus, a silver film was deposited to a geometrical thickness of 23 nm on the mixture film deposited on the inclined surface of the prism. Evaporation of the silver was effected by heating it by the use of a resistance heater made of tungsten, and the deposition speed of the silver film was 1-3 Å/sec. The control of the film thickness of the silver film and the control of the deposition speed thereof was effected by the use of a crystal vibration type device. The pressure in the vacuum evaporation apparatus during the deposition of the silver film was maintained below $3 \times 10^{-5}$ Torr.

Subsequently, a second mixture film of titanium oxide and zirconium oxide was deposited to an optical thickness of about 150 nm on the silver film.

The conditions under which the second mixture film was deposited were the same as the conditions under the first mixture film was deposited.

The prism having attached a symmetrical three-layer film comprising a silver film sandwiched between the mixture films of titanium oxide and was removed from the vacuum evaporation apparatus. Thereafter a prism of the same shape and the same material as the prism having the films attached thereto was joined to the latter prism by the use of a transparent adhesive agent, as shown in FIG. 2. When joining the two prisms, the inclined surfaces of the two prisms were wiped and were cleaned by lens cleaning paper impregnated with a mixture of ether and alcohol. No variation in appearance was found on the three-layer film attached to the inclined surface of the prism and it was confirmed that the film was strong enough to withstand wiping and cleaning. The adhesive agent used consisted of an epoxy adhesive for lens and an ultraviolet ray setting type acrylic adhesive for lens adhesion. Neither of these adhesives adversely affected the film and they exhibited a good adhesive property.

After the achromatized beam splitter of low polarization thus made was left in an atmosphere of temperature 45° C. and relative humidity 95% for 500 hours, it was observed that no variation in the appearance and optical characteristics thereof was found.

Figure 3:
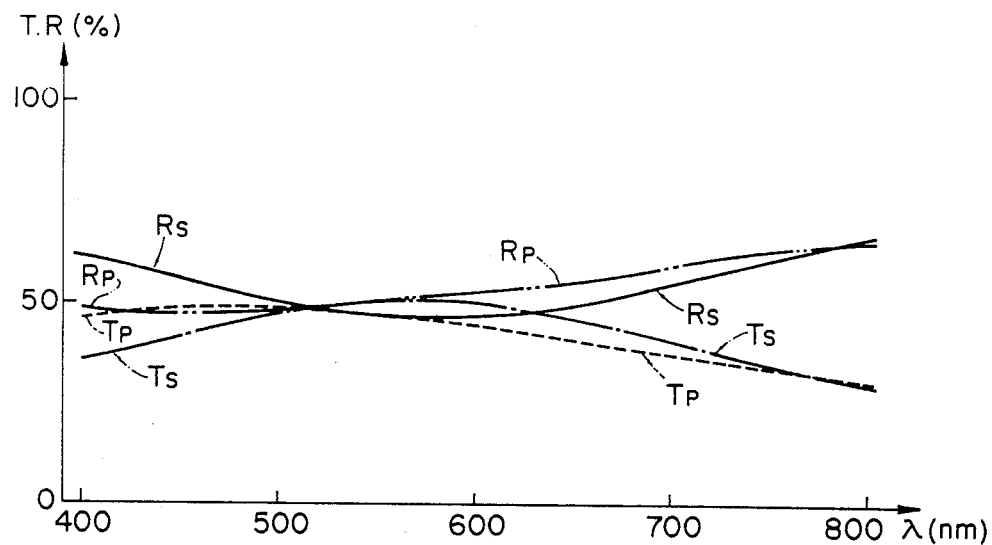
FIGS. 3 and 4 are graphs illustrating the spectral optical characteristics of embodiments of the beam splitter according to the present invention.

FIG. 3 is a graph illustrating the optical spectral characteristics of the beam splitter made in accordance with the above-described first embodiment. In this graph, Ts and Rs are curves indicating the transmission factor and reflection factor, respectively, of the S polarized component, and Tp and Rp are curves indicating the transmission factor and reflection factor, respectively, of the P polarized component. The vertical axis T.R represents the transmission factor and reflection factor, and the horizontal axis λ represents the wavelength of light. As is apparent from FIG. 3, the present embodiment is excellent as an achromatized beam splitter of low polarization which divides the transmitted light and the reflected light into 1:1.

Second Embodiment:

The second embodiment was made by the same method as the first embodiment with the exception that the film thickness of the silver film was of a geometrical thickness of 30 nm and that the mixture ratio of titanium oxide and zirconium oxide to be deposited by evaporation was of a mol ratio of 1:4. The depositing conditions of the three-layer film were the same as those for the first embodiment, and the ease of manufacturing was also the same as that for the first embodiment. In durability, the second embodiment was just like the first embodiment and offered no problem.

Figure 4:
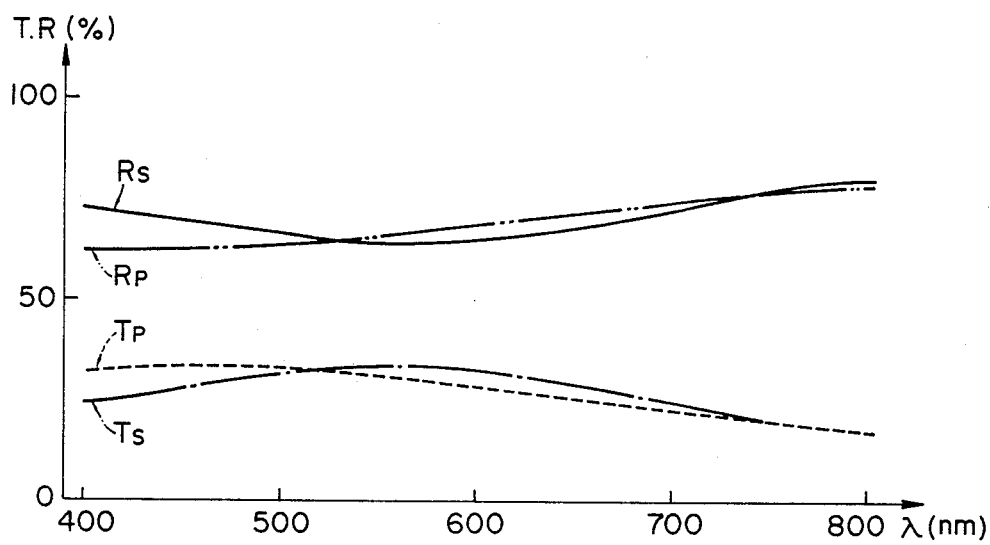

FIG. 4 is a graph illustrating the optical characteristics of the achromatized beam splitter of low polarization made in accordance with the second embodiment. As illustrated in FIG. 4, it is seen that this embodiment is one which is of low polarization and excellent in achromatism as a beam splitter which divides the ratio of the transmitted light and the reflected light into 1:2.

As described above, the beam splitter according to the present invention is a very excellent beam splitter which has the optical characteristics and chemical and mechanical durability of the conventional beam splitter and it can be easily produced and excels in reproducibility.

What we claim is:

1. An achromatized beam splitter of low polarization comprising:
   a transparent first prism;
   a transparent second prism; and
   a thin film group provided between said first prism and said second prism, said thin film group including, in succession from the first prism to the second prism,
   a first dielectric material thin film layer being provided on the inclined surface of said first prism said first layer being a mixture of titanium oxide and zirconium oxide;
   a metal thin film layer provided on said first dielectric material thin film layer which consists of silver; and a second dielectric material thin film layer provided on said metal thin layer said second layer being a mixture of titanium oxide and zirconium oxide, said second layer having a film thickness substantially equal to that of said first dielectric material thin film layer.

2. The beam splitter according to claim 1, wherein the value of the optical film thickness of said first and second dielectric material thin film layers is about ¼ of the design wavelength.

3. The beam splitter according to claim 1, wherein the layers forming said dielectric material thin film layers are formed by titanium oxide and zirconium oxide being deposited by evaporation at a mol ratio in the range of 1:6 to 1:4.

4. An achromatized beam splitter of low polarization comprising:

a first transparent prism having a shape of a right isosceles triangle;

a first dielectric material thin layer being provided on the inclined surface of said first prism, said first layer being a mixture film of titanium oxide and zirconium oxide;

a second dielectric material thin film layer provided on said metal thin film layer, said second layer being a mixture of titanium oxide and zirconium oxide, said second dielectric material thin film layer having a film thickness substantially equal to that of said first layer; and a second prism having its inclined surface attached to said second layer by a transparent adhesive agent, said second prism being of a shape substantially the same as that of said first prism.

5. The beam splitter according to claim 4, wherein the value of the optical film thickness of said first and second dielectric material thin film layers is about ¼ of the design wavelength.

* * * * *

UNITED STATES PATENT AND TRADEMARK OFFICE
CERTIFICATE OF CORRECTION

PATENT NO. : 4,415,233

DATED : November 15, 1983

INVENTOR(S) : SUSUMU ITOH, et al.

It is certified that error appears in the above-identified patent and that said Letters Patent is hereby corrected as shown below:

Column 3, line 4, "too" should read --two--;
         line 34, "10 A/sec." should read --10 Å/sec.--;
         line 38, "wave-length" should read --wavelength--;
         line 57, after "under" insert --which--;
         line 61, delete "and";
         line 61, before "was" insert --,--.

Column 4, line 18, after "respectively" change ";" to --,--.

Signed and Sealed this

Fourteenth Day of August 1984

[SEAL]

Attest:

GERALD J. MOSSINGHOFF

*Attesting Officer*      *Commissioner of Patents and Trademarks*